US011312476B2

(12) United States Patent
Hoemke et al.

(10) Patent No.: US 11,312,476 B2
(45) Date of Patent: Apr. 26, 2022

(54) PROPELLER CONTROL UNIT

(71) Applicant: Woodward, Inc., Fort Collins, CO (US)

(72) Inventors: Brian Hoemke, Rockford, IL (US); Brett A. Flannery, Poplar Grove, IL (US)

(73) Assignee: WOODWARD, INC., Fort Collins, CO (US)

(*) Notice: Subject to any disclaimer, the term of this patent is extended or adjusted under 35 U.S.C. 154(b) by 523 days.

(21) Appl. No.: 15/714,516

(22) Filed: Sep. 25, 2017

(65) Prior Publication Data

US 2019/0092453 A1 Mar. 28, 2019

(51) Int. Cl.
| | | |
|---|---|---|
| *B63H 1/06* | (2006.01) | |
| *B64C 11/30* | (2006.01) | |
| *B64C 11/38* | (2006.01) | |
| *B64C 11/40* | (2006.01) | |
| *B64C 11/42* | (2006.01) | |

(52) U.S. Cl.
CPC ............ *B64C 11/303* (2013.01); *B64C 11/38* (2013.01); *B64C 11/385* (2013.01); *B64C 11/40* (2013.01); *B64C 11/42* (2013.01)

(58) Field of Classification Search
CPC ..... B64C 11/303; B64C 11/385; B64C 11/40; B64C 11/42
USPC ........................................................ 416/154
See application file for complete search history.

(56) References Cited

U.S. PATENT DOCUMENTS 2,756,012 A * 7/1956 Moore .................... B64C 11/40
 244/81
2,798,563 A * 7/1957 Miller ................... B64C 11/385
 416/45

(Continued)

FOREIGN PATENT DOCUMENTS

EP 0200337 5/1986

OTHER PUBLICATIONS

Fluid Flow, Hydraulic Servo Valves, Mar. 12, 2013, http://www.valvehydraulic.info/creation-and-control-of-fluid-flow/hydraulic-servo-valves.html, See Figures 4.40, 4.41 and 4.42 and corresponding text (Year: 2013).*

(Continued)

*Primary Examiner* — Hung Q Nguyen
*Assistant Examiner* — Anthony Donald Taylor, Jr.
(74) *Attorney, Agent, or Firm* — McAndrews, Held & Malloy, Ltd.

(57) ABSTRACT

The present disclosure describes a propeller control unit for controlling the blade pitch of a propeller. The unit includes an electrohydraulic servo valve ("EHSV") and is connected to a propeller actuator that adjusts the blade pitch of a propeller. The EHSV operates to allow pressurized fluid to flow from a pressurized fluid source to the actuator to adjust the blade pitch of the propeller in a flight pitch range and a ground pitch range, to allow pressurized fluid to flow from the source to the actuator to adjust the blade pitch of the propeller in a flight pitch range but not a ground pitch range, and to block the flow of pressurized fluid from the source to the actuator and drain pressurized fluid from the actuator to prevent adjustment of the blade pitch of the propeller in the flight pitch range or the ground pitch range.

13 Claims, 6 Drawing Sheets

(56) References Cited

U.S. PATENT DOCUMENTS

| | | | | |
|---|---|---|---|---|
| 2,840,170 A * | 6/1958 | Best | B64C 11/40 | 416/47 |
| 2,840,171 A * | 6/1958 | Jedrziewski | B64C 11/385 | 416/47 |
| 2,865,460 A * | 12/1958 | John, Jr. | B64C 11/40 | 416/47 |
| 2,943,686 A * | 7/1960 | Luiz | B64C 11/385 | 416/50 |
| 2,980,188 A * | 4/1961 | Allen, Jr. | B64C 11/40 | 416/46 |
| 2,986,222 A | 5/1961 | Biermann | | |
| 3,004,608 A * | 10/1961 | Pond | B64C 11/40 | 416/47 |
| 3,057,410 A | 10/1962 | Biermann | | |
| 3,115,938 A * | 12/1963 | Fischer | B64C 11/385 | 416/48 |
| 3,207,227 A * | 9/1965 | Timewell | B64C 11/42 | 416/46 |
| 3,387,663 A * | 6/1968 | Barnes | B64C 11/30 | 416/48 |
| 3,527,186 A * | 9/1970 | Wennberg | G05D 1/0206 | 114/144 R |
| 3,575,529 A | 4/1971 | Bierman | | |
| 4,533,295 A * | 8/1985 | Duchesneau | B64C 11/38 | 416/157 R |
| 4,588,354 A * | 5/1986 | Duchesneau | B64C 11/38 | 416/27 |
| 4,671,736 A * | 6/1987 | Finnigan | B64C 11/38 | 416/46 |
| 4,986,734 A * | 1/1991 | Layer | B64C 11/40 | 416/48 |
| 5,174,718 A * | 12/1992 | Lampeter | B64C 11/38 | 416/157 R |
| 5,186,608 A * | 2/1993 | Bagge | B64C 11/38 | 416/147 |
| 5,836,743 A * | 11/1998 | Carvalho | B64C 11/385 | 416/139 |
| 5,897,293 A * | 4/1999 | Arel | B64C 11/303 | 416/114 |
| 6,059,528 A * | 5/2000 | Danielson | B64C 11/303 | 416/153 |
| 6,077,040 A * | 6/2000 | Pruden | B24C 11/00 | 416/153 |
| 7,118,336 B2 * | 10/2006 | Waddleton | B64C 11/38 | 416/1 |
| 8,726,787 B2 | 5/2014 | Glynn et al. | | |
| 9,169,783 B2 | 10/2015 | Kleckler | | |
| 2006/0029496 A1 * | 2/2006 | Carvalho | B64C 11/30 | 416/1 |
| 2007/0212220 A1 | 9/2007 | Perkinson et al. | | |
| 2013/0323050 A1 * | 12/2013 | Kleckler | F02C 9/58 | 416/1 |
| 2016/0244149 A1 | 8/2016 | Carrington | | |
| 2017/0253318 A1 | 9/2017 | Williams et al. | | |
| 2018/0057146 A1 * | 3/2018 | Futa, Jr | B64C 11/385 | |

OTHER PUBLICATIONS

PCT, Notification of Transmittal of the International Search Report and the Written Opinion of the International Searching Authority, or the Declaration, dated Dec. 3, 2018, 18 pages.

McCauley, McCauley Constant Speed Propeller Governing System, Booklet, Form No. MPC-3B, 12 pages.

McCauley, McCauley Full Feathering Constant Speed Propeller Governing System, Booklet, Form No. MPC-4 Revised Jun. 2008, 16 pages.

McCauley, Propeller System Technology Guide, Booklet, 20 pages.

* cited by examiner

PROPELLER CONTROL UNIT

BACKGROUND OF THE INVENTION

A propeller control unit or propeller governor is a system that controls the blade pitch of a variable pitch airplane propeller to allow the engine driving the propeller to run at a constant speed in some circumstances, and allow the blade pitch to be controlled to a user specified input, in other circumstances. Early propeller control units were mechanical systems that used flyweights for sensing speed and complex linkages for controlling the blade pitch. Different configurations of electric propeller control units, such as electrohydraulic control units, have been developed that take advantage of electronic control technology. However, the cost and weight associated with electrohydraulic control units can be a barrier to entry of electronic based propeller control units being used in smaller plane engines.

SUMMARY OF THE INVENTION

Certain aspects of the present technology provide a propeller control unit for controlling the blade pitch of a propeller. The propeller control unit includes an electrohydraulic servo valve ("EHSV") configured to receive pressurized fluid. The EHSV is connected to a propeller actuator that hydraulically adjusts the blade pitch of a propeller. The EHSV can be operated to (i) allow pressurized fluid to flow to the actuator to hydraulically adjust the blade pitch of the propeller in a flight pitch range (known as "alpha") and in a ground pitch range (known as "beta"), (ii) allow pressurized fluid to flow to the actuator to hydraulically adjust the blade pitch of the propeller in a flight pitch range but not in a ground pitch range, and (iii) block the flow of pressurized fluid to the actuator and drain pressurized fluid from the actuator to prevent hydraulic adjustment of the blade pitch of the propeller in the flight pitch range or in the ground pitch range, while also driving the actuator to a failsafe position wherein the propeller blades are in a full flight feather position.

In some embodiments, the propeller control unit may be connected to a hydraulic pressure source that is upstream of and connected to the EHSV and may also be connected to an electronic control unit that controls the source, the EHSV, and the actuator. The actuator may also include a first control flow input and a second control flow input that can be used to control the blade pitch of the propeller in the flight pitch range and the ground pitch range, respectively. The EHSV may be connected to the first control flow input and a drain and be operable to allow or disallow pressurized fluid from the source to flow into the first control flow input and be operated to connect or disconnect the first control flow input to the drain to drain pressurized fluid from the first control flow input. The EHSV may be connected to the second control flow input and operable to allow or disallow pressurized fluid from the source to flow into the second control flow input and be operable to connect or disconnect the second control flow input to the drain.

Certain aspects of the present technology provide a propeller control unit for controlling the blade pitch of a propeller and that operates in a ground beta enable mode, a flight mode, and an overspeed protection mode. The propeller control unit includes an EHSV configured to receive pressurized fluid. The control unit is connected to a propeller actuator that can hydraulically adjust the blade pitch of the propeller in a flight range of blade pitch and a ground range of blade pitch. The EHSV is configured to allow pressurized fluid to flow to the actuator. When the control unit is in ground beta mode, the EHSV operates to allow pressurized fluid from a pressurized fluid source to flow to the actuator so that the blade pitch can be hydraulically adjusted in the ground pitch range, including a reverse pitch. When the control unit is in the flight mode, the EHSV operates to allow pressurized fluid from the source to flow to the actuator so that the blade pitch can be hydraulically adjusted within the flight range but not within the ground pitch range. When the control unit is in the overspeed protection mode, the EHSV operates to drain pressurized fluid from the actuator and prevent pressurized fluid from the source from flowing into the actuator so that the blade pitch cannot be hydraulically adjusted. The blades are able to move to a feathered pitch position in the overspeed protection mode.

In some embodiments, a hydraulic pressure source may be located upstream of and be connected to the EHSV. An electronic control unit can be used to control the EHSV, the source, and the actuator. The actuator may include a first control flow input and a second control flow input that are each connected to the EHSV and that can be used to control the blade pitch of the propeller in the flight pitch range and the ground pitch range, respectively.

Certain aspects of the present technology include a propeller control unit for controlling the blade pitch of a propeller. The propeller control unit is connected to an electronic control unit and a hydraulic pressure source, and includes an EHSV connected to a pressure drain. The control unit further includes a first control flow input to an actuator connected to the EHSV that, when pressurized, operates to control the pitch of a propeller in a flight range of blade pitch. The control unit further includes a second control flow input to the actuator connected to the EHSV that, when pressurized, operates to control the pitch of a propeller in a beta range of blade pitch. The electronic control unit controls the flow of pressurized fluid from the pressure source to the EHSV. The EHSV can be operated to provide the pressurized fluid to both the first control flow input and the second control flow input and seal off the first control flow input and the second control flow input from the pressure drain so that the propeller can be hydraulically adjusted via the second control flow input in the beta range of blade pitch. The EHSV also can be operated to provide pressurized fluid from the source to the first control flow input, seal off the second control flow input from the pressurized fluid from the source, open the second control flow input to the pressure drain, and seal off the first control flow input from the pressure drain so that the propeller can be hydraulically adjusted via the first control flow input in the flight range of blade pitch. The EHSV also can be operated to seal off the second control flow input and first control flow input from the pressurized fluid from the source and open the second control flow input and first control flow input to the pressure drain so that the propeller can move to a feathered pitch.

BRIEF DESCRIPTION OF THE DRAWINGS

FIG. 1 illustrates a schematic of an electrohydraulic propeller control system in a variety of positions according to an embodiment of the present invention.

DETAILED DESCRIPTION OF THE INVENTION

FIG. 1 illustrates an example of an electrohydraulic propeller control unit or governor 100. The propeller control unit 100 is coupled, via a first propeller control flow input 104 and a second propeller control flow input 108, to a blade pitch adjustment actuator 102 that operates to control the blade pitch of an airplane propeller 105. The control unit 100 is also connected to propeller pitch oil flow controller or primary propeller pitch control unit 116. The propeller control unit 100 is of the type that would be used to control the blade pitch on the propeller of an aircraft, e.g., a turboprop. However, the concepts herein can be applied to governing propellers and fans of other vehicles and mechanisms.

Propeller blade pitch is the angle of attack of the propeller's blades. The steeper the pitch, also called coarse or feather, the higher the angle of attack and the nearer the blades of the propeller are to being in alignment with the direction of airflow. The shallower the pitch, also called fine, the lower the angle of attack and the nearer the blades of the propeller are to being perpendicular with the direction of airflow. This understanding of how a propeller control unit can be used to control the pitch of a propeller is further described in U.S. Pat. No. 9,169,783, which is incorporated herein in its entirety by reference.

The example control unit 100 controls the blade pitch in one of three modes: a flight mode intended to be used during flight, a ground beta mode intended to be used during taxiing on the ground and during thrust reverse to reduce speed after landing, and full feather overspeed protection mode to be used during flight or on the ground. In the flight mode, the pitch of the blades is automatically maintained within a first range of blade pitch and adjusted by the control unit 100 in response to the rotational speed of the propeller to maintain a user specified rotational speed. The first range of blade pitch runs from shallow (fine) to coarse and includes only forward pitch angles that would be used during flight. By way of example only, the minimum pitch in the first range is 15 degrees.

In contrast, in ground beta mode, the pitch of the blades is maintained within a second range of blade pitch and adjusted by the control unit 100 in response to a user specified blade pitch, i.e., to maintain the user-specified blade pitch. The second range of blade pitch runs from shallow (fine) to full reverse, i.e., it includes both forward pitch angles and reverse pitch angles. The second range, for example, includes pitch angles that would be used during taxiing of the aircraft on the ground. The forward pitch angles are those that drive the aircraft forward, while the reverse pitch angles are those that drive the aircraft in reverse. In certain instances, the first range of blade pitch (i.e., the range used in flight mode) does not overlap with the second range of blade pitch (i.e., the range used in ground beta mode), and it would not be safe for propeller blades to move into the second range during flight.

In cases of overspeed by the engine, i.e., the engine spins at a speed beyond its design limit, the unit 100 operates in full feather overspeed protection mode, in which the pitch of the propellers is maximized such that the propeller blades are parallel or close to parallel to the airstream. Such a pitch is desirable if one of the engines should fail because propeller blades that are parallel to the airstream are less likely to windmill or create drag, which can create asymmetric control forces in twin engine applications.

The propeller control unit 100 is an electrohydraulic propeller governor in that it uses an electronic control unit ("ECU") 110 to control an electrohydraulic servo valve 106 that provides pitch control redundancy, overspeed protection, and ground beta enable. The electrohydraulic system uses pressurized hydraulic fluid such as, by way of example only, oil. Unlike a fully mechanical propeller governor, the electrohydraulic propeller control unit 100 does not need flyweights or complex linkages to control blade pitch.

The servo valve 106 modulates pressure in the propeller control unit 100 to control whether the control unit 100 operates in the flight mode, ground beta mode, or feathering mode, and to adjust the blade pitch within each of those modes. The servo valve 106 receives pressurized oil from the controller (or fluid source) 116. The controller 116 is connected to an oil supply tank (not shown) and has an outlet path 132 that leads into the servo valve 106. Oil flows from the controller 116 through the outlet path 132 into the servo valve 106, and the controller 116 controls the flow, i.e., the pressure, of oil entering the servo valve 106 through the outlet path 132. Alternatively, pressurized oil can be fed into the servo valve 106 from other kinds of devices or indirectly from the controller 116. The outlet path 132 connects to a first pressure path 156 that leads to the servo valve 106. In some embodiments, the controller 116 can operate as a primary propeller control unit, such that it directs either high pressure, drain pressure, or some pressure in between high pressure and low pressure to the outlet path 132 in response to commands from the ECU in order to effect controlled movement of the propeller pitch control actuator 102 such as in unrestricted full flight and ground beta modes, which are discussed in more detail below. In such circumstances, the valve 106 facilitates direct control of the actuator 102 by the controller 116, as discussed in more detail below.

The servo valve 106, in certain instances, is of a type that includes a valve body 200 that defines an internal piston cavity 204 and a routing piston 208 sealingly received within the cavity 204. Other types of servo valves can be used. A valve position control device 198 is coupled to the routing piston 208 to move the piston 208 between upper, intermediate, and lower positions in response to a signal from the ECU. By way of example only, the valve position control device 198 is a dual nozzle flapper but can be another type of valve control device. The upper, intermediate, and lower positions of the piston 208 are related or proportional to an electrical signal sent to the valve position control device 198 from the ECU. The internal piston cavity 204 is connected to a first port 212, a second port 216, a third port 220, a forth port 224, and a fifth port 228. The fourth port 224 is in communication with an output path 232, which leads to the second propeller control flow input 108. The second propeller control flow input 108 connects to the blade pitch adjustment actuator 102 of the propeller. When pressurized fluid is fed into the second propeller control flow input 108, the pilot can operate the actuator 102 in ground beta enable mode to adjust the pitch of the propeller in a range below a flight minimum pitch angle or even to full reverse pitch during ground beta mode.

The first port 212 is in communication with the first pressure path 156 that is connected to the outlet path 132 leading from the controller 116. The fifth port 228 is in communication with a second pressure path 158 that also is in communication with the outlet path 132. The first port 212 and fifth port 228 thus receive pressurized fluid from the controller 116. The second port 216 is in communication with an output path 240, which leads to the first propeller control flow input 104. The first propeller control flow input 104 connects to or is part of the blade pitch adjustment actuator 102 of the propeller. When pressurized fluid is fed into the first propeller control flow input 104, the pitch of the propeller can be adjusted between fine and coarse pitch angles above the minimum pitch angle in flight mode. The third port 220 is in communication with a pressure drain 248 that leads, for example, back to the oil supply tank from which the propeller pitch controller 116 receives oil. Alternatively, the drain 248 could recirculate fluid back to the controller 116 or some other low pressure area other than the oil supply tank. The pressure drain 248 has a lower pressure than the oil flow controller outlet path 132.

The routing piston 208 of the servo valve 106 has a first control passage 252, a second control passage 256, and a third control passage 258 that operate to connect ports. For example, when the piston 208 is in the upper position, i.e., pressed up all the way to the end 160 of the cavity 204, the first control passage 252 puts the first port 212 in fluid communication with the second port 216, and the third control passage 258 puts the fourth port 224 in fluid communication with the fifth port 228. In this way, the first control passage 252 feeds the first propeller control flow input 104 with pressurized fluid that has passed through the first pressure path 156, and the third control passage 258 feeds the second propeller control flow input 108 with pressurized fluid that has passed through the second pressure path 158. In addition, when the piston 208 is in the upper position, a first land 290 of the piston 208 prevents the second port 216 from being in fluid communication with the third port 220 (and thus the drain 248), and a second land 294 of the piston prevents the fourth port 224 from being in fluid communication with the third port 220 (and thus the drain 248). When the piston 208 is in the upper position, the unit 100 is in ground beta mode, and the controller 116 can directly control the actuator 102 by controlling the pressure and flow of fluid to the first and second propeller control flow inputs 104 and 108.

When the piston 208 is in the down position, i.e., pressed down all the way to end 162 of the cavity 204, first end portion 296 of the piston 208 blocks the first port 212 such that pressurized fluid cannot flow from the first port 212 to the second port 216. Moreover, when the piston 208 is in the down position, the fourth port 224 communicates pressurized fluid from the output path 232 to the pressure drain 248 via the second control passage 256, and the second port 216 communicates pressurized fluid from the output path 240 to the pressure drain 248 via the first control passage 252. When the piston 208 is in the down position, the unit 100 is in full feather (or overspeed protection) mode, and the valve 106 prevents the flow of fluid from the controller 116 to the actuator 102.

When the piston 208 is in an intermediary range of positions between the up and down positions as shown in FIG. 1, the first end portion 296 of the piston 208 blocks off the first port 212 to prevent the flow of pressurized fluid from the controller 116 (via the second port 216) to the first propeller control flow input 104. In addition, when the piston 208 is in the intermediary range of positions shown in FIG. 1, the second control passage 256 communicates pressurized fluid from the second propeller control flow input 108 to the pressure drain 248 via the third and fourth ports 220 and 224, but the first land 290 of the piston 208 blocks the third port 220 from the second port 216 to prevent pressurized fluid from flowing from the first propeller control flow input 104 to the pressure drain 248. The second land 294 blocks the flow of fluid from the fifth port 228 to the fourth port 224, and thus prevents fluid from going to the second propeller control flow input 108. When the piston 208 is in the intermediary range of positions shown in FIG. 1, the unit 100 is in a backup feathering (or restricted) flight mode wherein the valve 106 controls the actuator 102 during flight mode and prevents control of the actuator 102 by the controller 116, i.e., the valve 106 provides redundant control of the actuator 102.

The piston 208 can also move to a sub-range within the intermediary range of positions where the first end portion 296 of the piston 208 is located closer to the top end 160 than where it is shown in FIG. 1 but is not yet engaging the top end 160. At that position, pressurized fluid can flow from the pressure path 156 and through ports 212 and 216 to the first propeller control flow input 104. The first land 290 prevents fluid from flowing (via port 216) from the first propeller control flow input 104 to the drain 248. The second land 294 still prevents fluid from flowing from port 228 and through port 224 to the second propeller control flow input 108, but port 224 is in fluid communication with drain 248, so pressurized fluid is drained from the second propeller control flow input 108. When the piston 208 is in this upper sub-range within the intermediary range of positions, the unit 100 is in normal or unrestricted flight operating (or alpha) mode. In this mode, the valve 106 allows the controller 116 to directly control the actuator 102 via the flow of fluid through the path defined by paths 132 and 156, port 212, passage 252, port 216, path 240, and input 104. The controller 116 can increase or decrease the fluid pressure to the actuator 102 as necessary to control and adjust the propeller in the fine pitch range and coarse pitch range. Pressure is decreased by allowing fluid to drain back into the controller 116 from the input 104.

Thus, the propeller control unit 100 can operate in at least four modes, namely, ground beta enable mode, normal unrestricted flight mode, backup feathering (or restricted) flight mode, and full feather overspeed protection mode. Movement of the piston to go into each mode is discussed below.

In operation, the ECU provides signals to the electronically responsive servo valve 106 of the propeller control unit 100 to operate in ground beta enable mode. In that regard, pressurized fluid flows from the oil flow controller outlet path 132 to the pressure paths 156 and 158 that feed into the servo valve 106. A maximum current (e.g., 80 mA) may be applied to the actuator of the servo valve 106 to move the piston 208 upward to the top end 160 such that the pressurized fluid can flow from the pressure path 132 through the first port 212, first control passage 252, and second port 216 to the first propeller control flow input 104 and through the fifth port 228, second control passage 258, and fourth port 224 to the second propeller control flow input 108. The piston 208 also blocks the outlet drain 248 such that pressurized fluid does not flow from either the first or second propeller control flow inputs 104 and 108 to the pressure drain 248. In this way the first and second propeller control flow inputs 104 and 108 are both pressurized and can be used to adjust the pitch of the propeller. Moreover, the pressure and flow of oil into the servo valve 106, and thus to the first and second propeller control flow inputs 104 and 108, can be controlled by the controller 116 to modulate blade pitch and any commanded angle between full reverse pitch and flight maximum pitch. Thus, in the ground beta enable mode, the pilot can operate the pressurized the first and second propeller control flow inputs 104 and 108, via the controller 116, to adjust the pitch of the propeller between the flight minimum angle and a full reverse pitch angle in order to move the move the plane backward and forward during taxiing on the runway and to slow the plane after landing.

The next mode that propeller control unit 100 operates in is normal maximum unrestricted flight mode. The ECU provides signals to the control unit 100 to go from ground beta enable mode to unrestricted flight mode. In response, a smaller current (e.g., 40 mA) is applied to the actuator of the servo valve 106 such that the piston 208 moves downward from the top end 160 toward the bottom end 162 into a first intermediary range of positions. In this position, the second land 294 of the piston 208 blocks off the fourth port 224 from the fifth port 228 such that pressurized fluid does not flow from the pressure path 158, via the fourth and fifth ports 224 and 228, to the second propeller control flow input 108. The first control passage 252 of the piston 208, however, allows pressurized fluid to continue to flow from the pressure path 156 to the first propeller control flow input 104 via the first port 212 and second port 216. At the same time, the land 290 of the piston 208 still blocks the flow of pressurized fluid from the first propeller control flow input 104 to the pressure drain 248, but the second control passage 256 of the piston 208 allows pressurized liquid to flow from the second propeller control flow input 108 to the pressure drain 248 by providing fluid communication between the fourth port 224 and the third port 220.

In this way, the servo valve 106 does not restrict the flow of pressurized fluid from the controller 116 via the pressure path 156 to the first propeller control flow input 104, and, thus, and the ECU can control the pressure and flow of oil from the controller 116 to adjust the pitch of the propellers in a range above the flight minimum pitch angle. Moreover, because the servo valve 106 blocks the flow of pressurized fluid from the controller 116 to the second propeller control flow input 108 and connects the second propeller control flow input 108 to the drain outlet 248, there is no pressurized fluid in the second propeller control flow input 104 that can cause the actuator to adjust the pitch of the propellers to a position below the flight minimum pitch angle or to a full reverse pitch. As such, the servo valve 106 locks out the propeller control unit 100 from entering the ground beta enable mode and, therefore, provides a safety measure that prevents the pitch from going below the flight minimum pitch angle or to a reverse pitch angle during flight.

The propeller control unit 100 can operate in the backup or restricted flight mode at a lower current range, e.g., −40 to +40 mA. When in the backup flight mode, the servo valve 106 provides redundant pitch control and prevents the controller 116 from controlling the actuator 102. In operation, the ECU provides signals to the unit 100 to go from unrestricted flight mode to the backup flight mode. In response, the electronically responsive servo valve 106 moves the piston 208 further downward toward the end 162 to a second intermediary range of positions (as shown in FIG. 1). In this position, the first end portion 296 of the piston 208 blocks off the first port 212 to prevent pressurized fluid from flowing from the pressure path 156 to the second port 216. In this way, the piston 208 prevents the pressurized fluid from the pressure path 156 from reaching the first propeller control flow input 104. At the same time, land 290 of the piston 208 still blocks the flow of pressurized fluid from the first propeller control flow input 104, via the second port 216, to the drain outlet 248, but the second control passage 256 of the piston 208 does keep the second propeller control flow input 108 in fluid communication with the pressure drain 248. The second land 294 prevents fluid from flowing from the pressure path 158 to the fourth port 224 and thus to the second propeller control flow input 108.

Therefore, in the backup flight mode, the servo valve 106 still locks the propeller control unit 100 out of the ground enable beta mode because the valve 106 prevents pressurized fluid from reaching the second propeller control flow input 108 and keeps the second propeller control flow input 108 connected to the outlet drain 248. Moreover, because the first propeller control flow input 104 is not connected to the drain outlet 248, there is still pressurized fluid acting on the first propeller control flow input 104. The servo valve 106 can be controlled by the ECU to adjust the pitch of the propeller between fine and coarse angles within in the flight pitch range independent of the controller 116. In particular, the servo valve 106 can be used to adjust the position of the piston 208 to allow fluid to flow from the pressure path 156 into the first propeller control flow input 104 or to allow fluid to flow from the first propeller control flow input 104 to the drain outlet 248. Thus, the servo valve 106 can be used to modulate control of the pitch angle. In this way, the servo valve 106 can operate as a redundant pitch control valve that can control the pitch of the propellers in flight if control of the flow of fluid from the controller 116 and outlet path 132 into the servo valve 106 fails or is compromised.

Finally, the propeller control unit 100 can be adjusted to operate in a full feathered overspeed protection mode. To operate in this mode, the ECU sends a signal to the servo valve 106 to apply a minimum current (e.g., −80 mA) to the coils of the valve position control device 198 such that the piston 208 moves all the way down to the bottom end 162. In this position, the first end portion 296 of the piston 208 blocks off the first port 212 to prevent pressurized fluid from flowing from the pressure path 156 to the first propeller control flow input 104 via the second port 216. At the same time, the second control passage 256 allows for fluid communication between the fourth port 224 and the third port 220, which connects the second propeller control flow input 108 to the pressure drain 248. The first control passage 252 allows for fluid communication between th second port 216 and the third port 220, which connects the first propeller control flow input 104 to the pressure drain 248. Moreover, the second land 294 prevents fluid from the flowing from the pressure path 158, via the fifth and fourth ports 228 224, to the second propeller control flow input 108.

Thus, in full feathered overspeed protection mode, both the first propeller control flow input 104 and the second propeller control flow input 108 are prevented from receiving pressurized fluid from the controller 116, via the pressurized paths 156 and 158, respectively, and both flow inputs are drained of any remaining pressurized fluid. As such, neither of the flow inputs 104 and 108 is able to direct movement of the actuator or adjust propeller pitch. In this way, the controller 116 and servo 106 are locked out from affecting the pitch of the propellers. Accordingly, the propeller blades, no longer being controlled by hydraulics, move on their own, via a spring return, or other means, to a feathered position i.e., roughly parallel with path of flight. Thus, the full feathered overspeed protection mode serves as a safety mode in case an engine should lose power during flight. The feathered propeller of the unpowered engine will not windmill or cause drag.

Figure 1A:
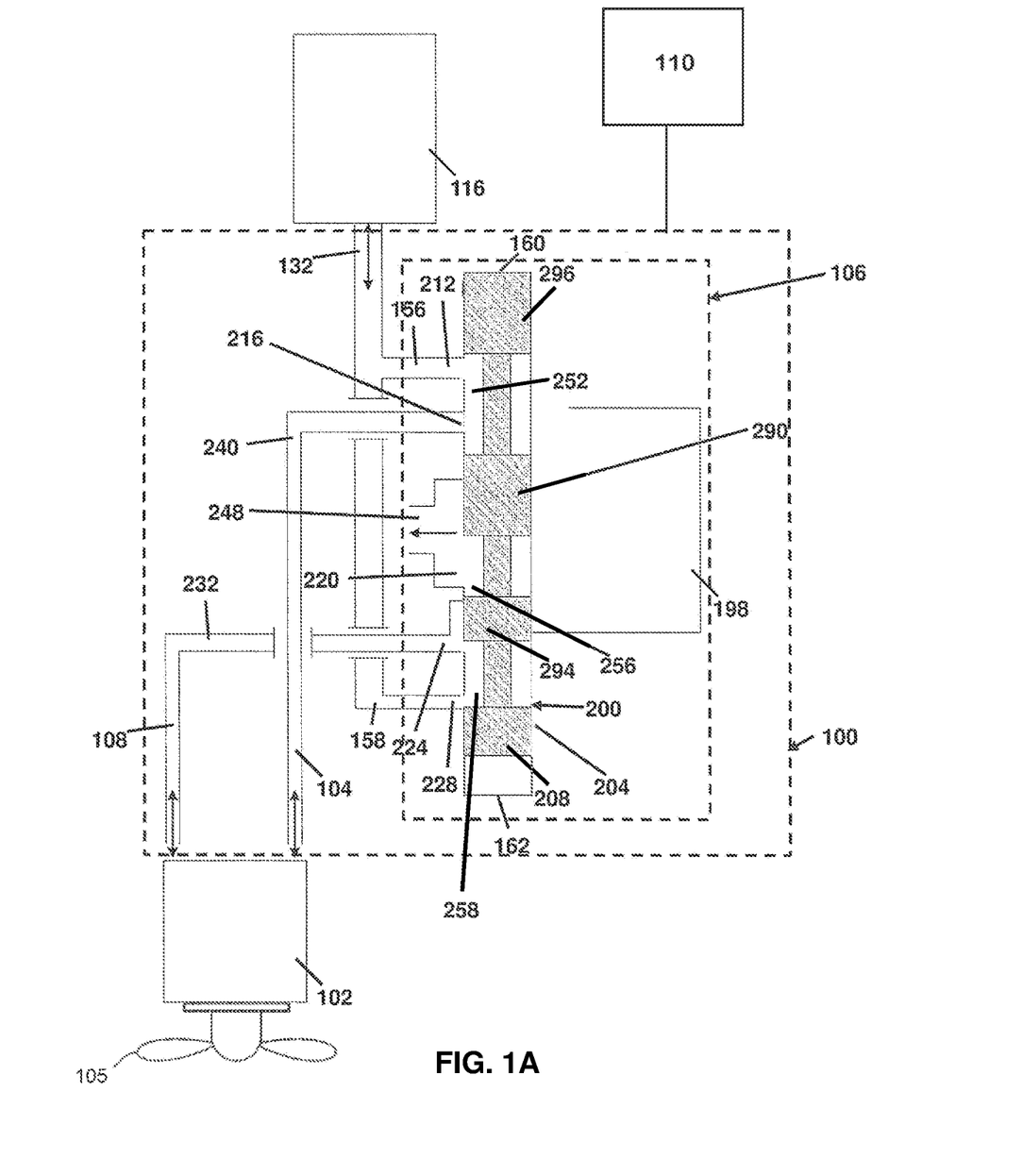
FIG. 1A illustrates the electrohydraulic propeller control system in a first position.
Figure 1B:
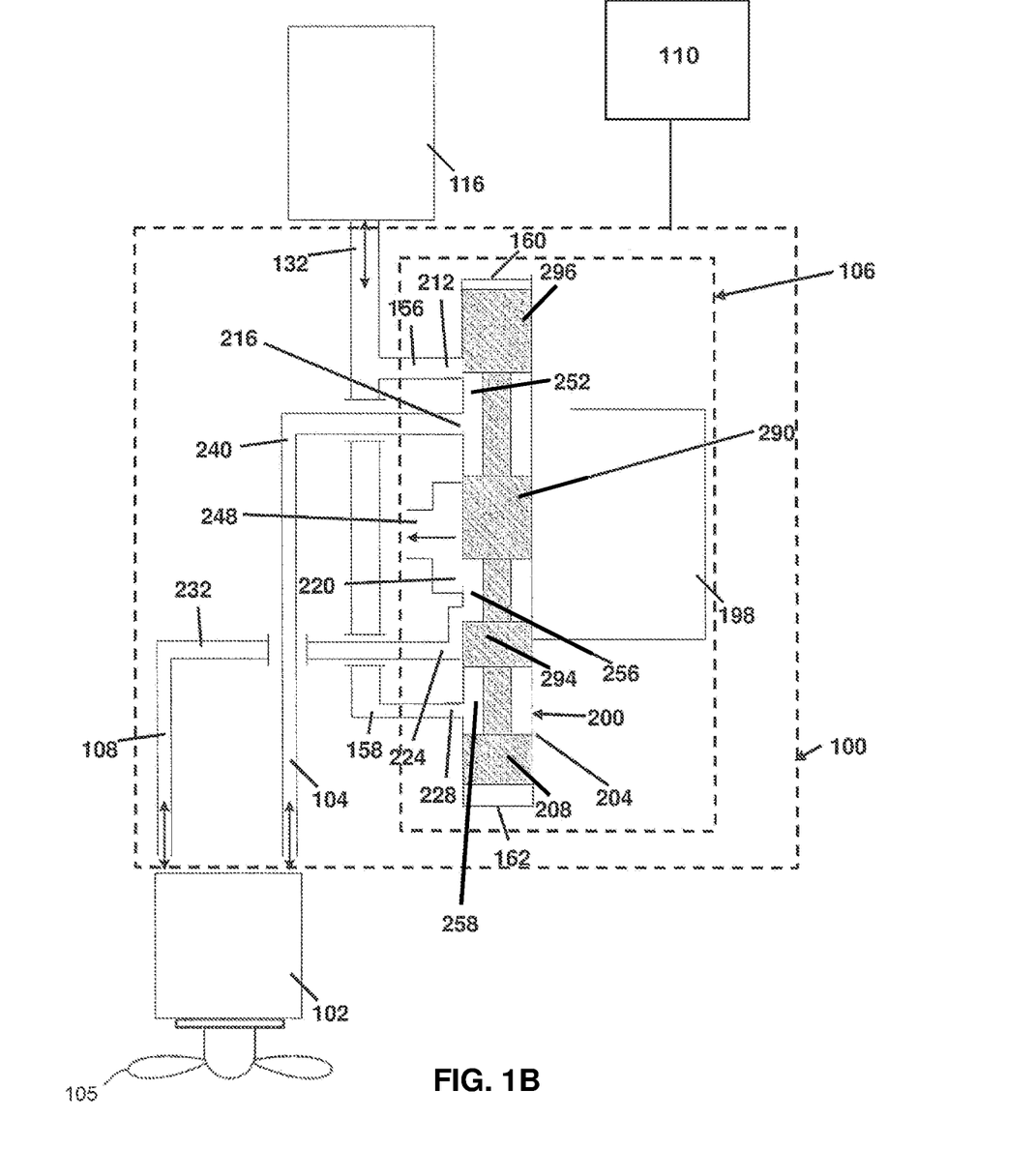
FIG. 1B illustrates the electrohydraulic propeller control system in a second position.
Figure 1C:
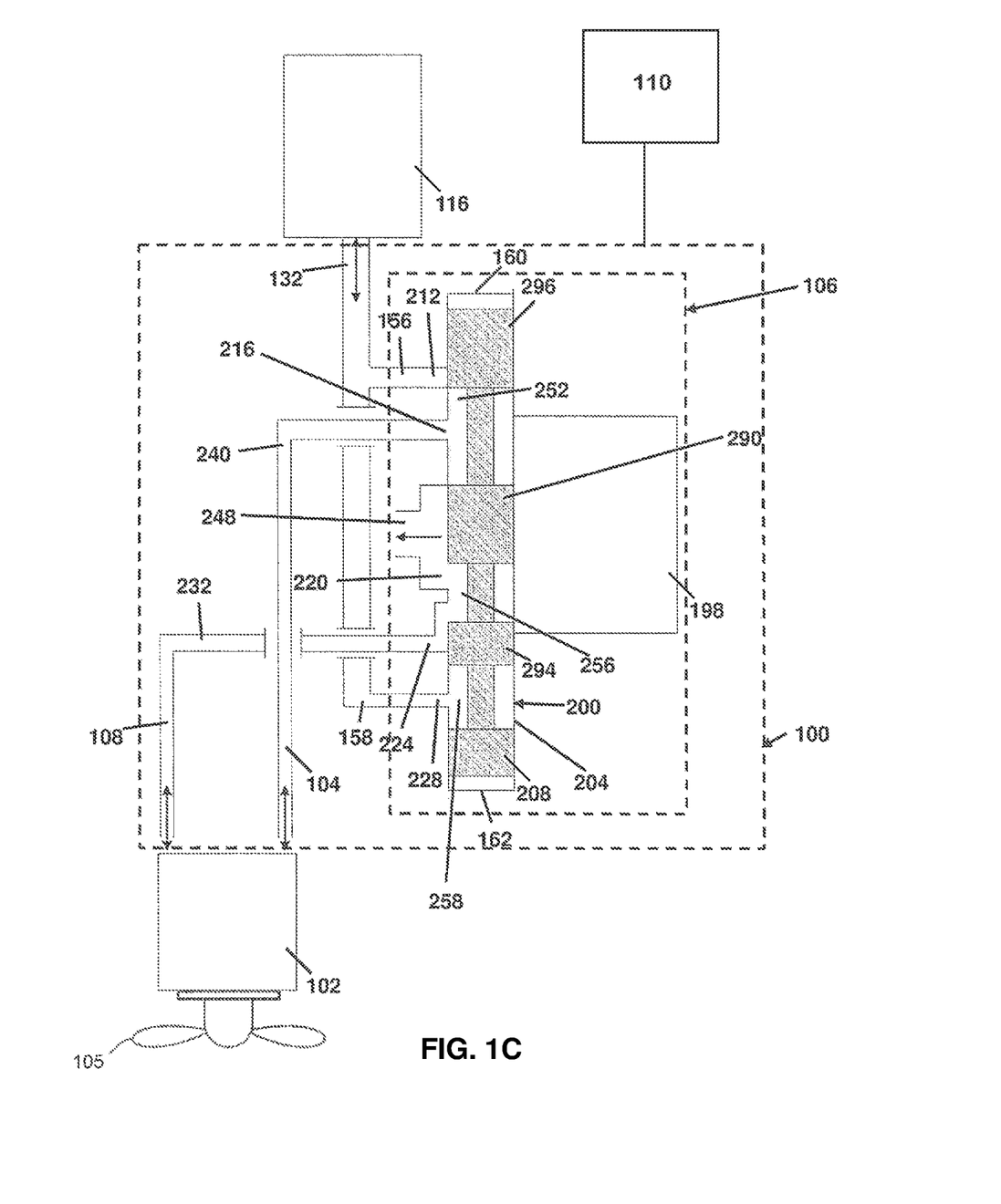
FIG. 1C illustrates the electrohydraulic propeller control system in a third position.
Figure 1D:
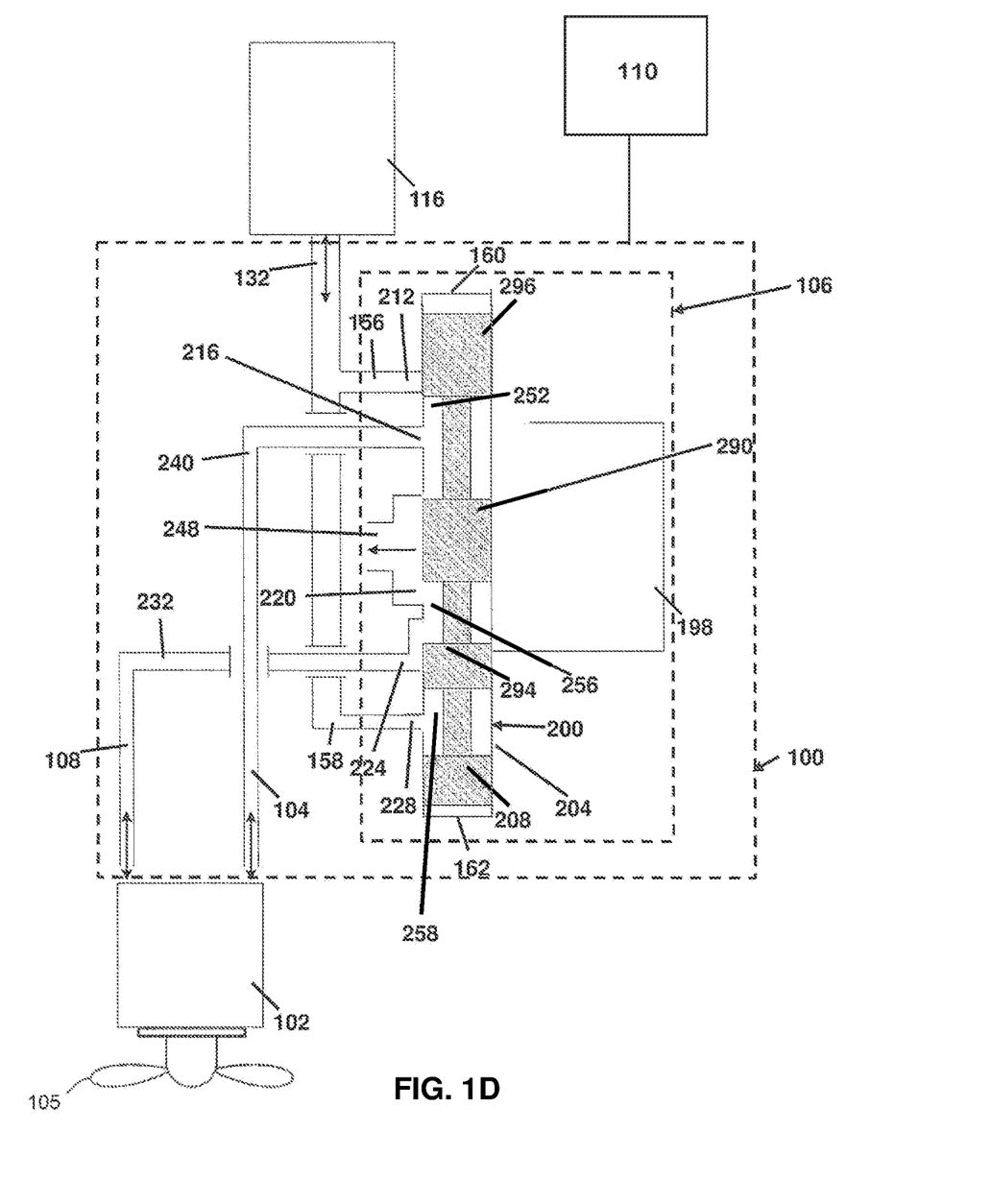
FIG. 1D illustrates the electrohydraulic propeller control system in a fourth position.
Figure 2A:
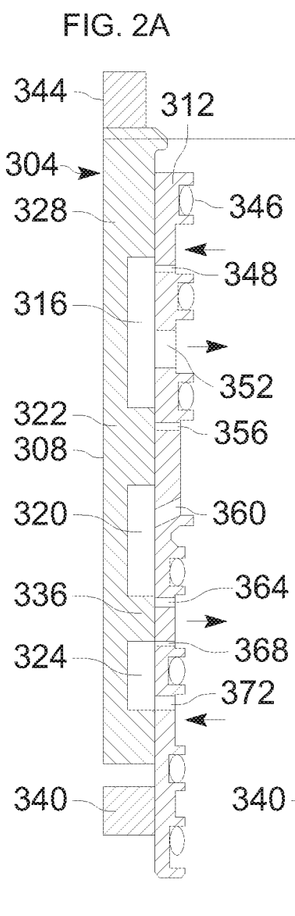
FIG. 2A illustrates a cross-sectional view of a valve used in an electrohydraulic propeller control unit and that allows for the control unit to be in ground beta enable mode according to an embodiment of the present invention.
Figures 2B, 2C, 2D:
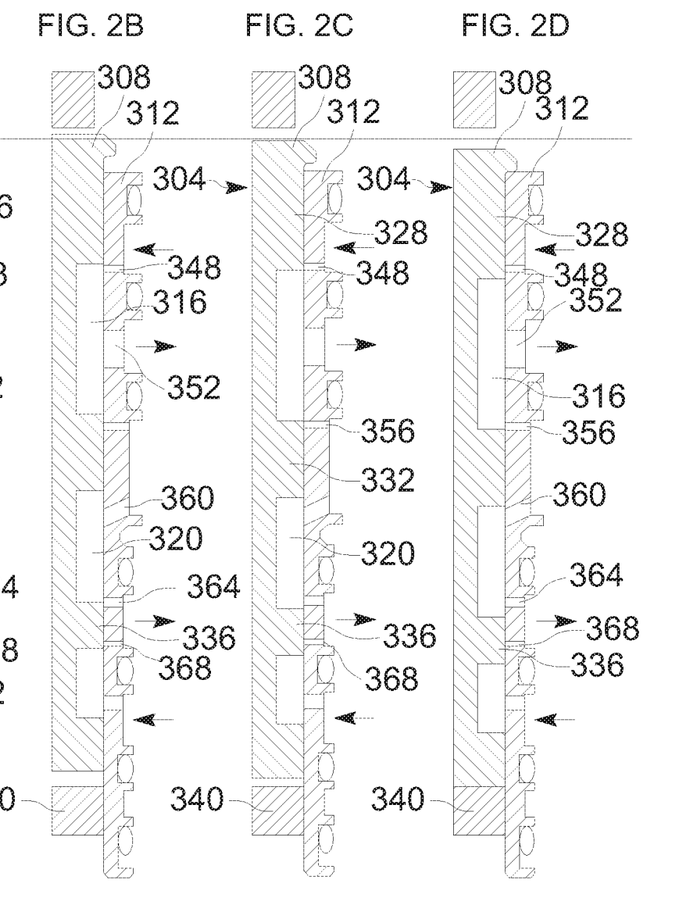
FIG. 2B illustrates a cross-sectional view of the valve of FIG. 2A in the position that allows for the control unit to be in normal unrestricted flight mode.
FIG. 2C illustrates a cross-sectional view of the valve of FIG. 2A in the position that allows for the control unit to be in restricted flight mode.
FIG. 2D illustrates a cross-sectional view of the valve of FIG. 2A in the position that allows for the control unit to be in full feather overspeed protection mode.

FIGS. 2a-d illustrate a cross-sectional view of a portion of an alternative embodiment of the servo valve 304 that can be used in the propeller control unit 100 of FIG. 1. FIG. 2a shows the valve 304 in the position that allows for the control unit 100 to be in ground beta enable mode. FIG. 2b shows the valve 304 in the position that allows for the control unit 100 to be in normal maximum unrestricted flight mode. FIG. 2c shows the valve 304 in the position that allows for the control unit 100 to be in the backup (or restricted) flight mode. FIG. 2d shows the valve 304 in the position that allows for the control unit 100 to be in full feather overspeed protection mode.

With reference to FIG. 2a, the valve 304 includes a piston 308 and a cylinder 312 that receives the piston 308. The piston 308 includes first, second, and third control passages 316, 320, and 324. The piston 308 includes first, second, and third lands 328, 332, and 336. The cylinder 312 includes a lower stop 340 that engages the bottom of the piston 308 to limit the downward movement of the piston 308 within the cylinder 312. The valve 304 further includes an upper stop 344 that engages a top of the piston 308 to limit the upward movement of the piston 308. FIGS. 2a-d show the full stroke range of motion of the piston 308, from the highest point it can go to (FIG. 2a) to the lowest point it can go to (FIG. 2d).

The cylinder 312 includes O-rings 346 that create seals between the cylinder 312 and the valve block within which the cylinder 312 is retained. The cylinder 312 includes a first port 348 that is configured to be in communication with the pressure path 156 (FIG. 1) that delivers pressurized fluid from the controller 116 (FIG. 1). The cylinder 312 includes a second port 352 that is configured to be in communication with the first propeller control flow input 104 (FIG. 1). The cylinder 312 includes a third port 356 and a fourth port 360 that are configured to be in communication with the pressure drain 248 (FIG. 1). The cylinder 312 includes a fifth port 364 and a sixth port 368 that are configured to be in communication with the second propeller control flow input 108 (FIG. 1). The cylinder 312 includes a seventh port 372 that is configured to be in communication with the pressure path 158 (FIG. 1) that delivers pressurized fluid from the controller 116 (FIG. 1).

In FIG. 2a, the valve 304 is positioned as necessary for the propeller control unit 100 (FIG. 1) to operate in ground beta enable mode. In that regard, piston 308 is in the uppermost position with the top of the piston 308 engaging the stop 344. The first control passage 316 is in communication with both the first port 348 and the second port 352, and the third control passage 324 is in communication with the sixth port 368 and the seventh port 372. In this way, the first and third control passage 316 and 324 allow pressurized fluid to flow from the controller 116 (FIG. 1) to the first propeller control flow input 104 (FIG. 1) and to the second propeller control flow input 108 (FIG. 1), respectively. Moreover, the second land 332 blocks the third port 356 to prevent fluid from flowing from the first propeller control flow input 104 to the pressure drain 248 (FIG. 1), and the third land 336 blocks the fifth port 364 to prevent fluid from flowing from the second propeller control flow input 108 (FIG. 1) to the pressure drain 248.

Thus, when the valve 304 is positioned as shown in FIG. 2a, both the first propeller control flow input 104 and the second propeller control flow input 108 (FIG. 1) are pressurized and can be used, via the controller 116, to adjust the pitch of the propeller. In particular, the pilot can use the ECU to control the pressurized second propeller control flow input 108 to adjust the pitch of the propeller between the flight minimum angle and a full reverse pitch angle in order to move the move the plane backward and forward during taxiing on the runway.

In FIG. 2b, the valve 304 is positioned as necessary for the propeller control unit 100 (FIG. 1) to operate in normal maximum unrestricted flight mode. In that regard, in response to a signal from the ECU, the piston 308 has been moved downward slightly in the cylinder 312 such that the second control passage 320 puts the fourth and fifth ports 360 and 364 in fluid communication such that the pressurized fluid in the second propeller control flow input 108 (FIG. 1) flows to the drain outlet 248 (FIG. 1). In addition, the third land 336 blocks the sixth port 368 such that pressurized fluid can no longer flow from the controller 116 (FIG. 1) via the pressure path 158 (FIG. 1) to the second propeller control flow input 108. However, the first control passage 316 still overlaps the first and second ports 348 and 352 such that pressurized fluid flows from the controller 116 via the pressure path 156 to the first propeller control flow input 104 (FIG. 1).

Thus, when the valve 304 is positioned as shown in FIG. 2b, the controller 116 (or other device that feeds pressurized fluid into the valve 304) can be used, via the ECU, to adjust the pitch of the propellers during flight via the first propeller control flow input 104 (FIG. 1), but the valve 304 prevents any pressurized fluid from entering the second propeller control flow input 108 (FIG. 1). Thus, the propeller control unit 100 (FIG. 1) is locked out of the ground enable beta mode in order to prevent the second propeller control flow input 108 (FIG. 1) from being pressurized and adjusting the actuator to bring the propeller blade pitch below the minimum flight pitch.

In FIG. 2c, the valve 304 is positioned as necessary for the propeller control unit 100 to operate in the backup flight mode. In that regard, the piston 308 has been moved further downward in the cylinder 312 such that the first land 328 blocks the first port 348 and thus prevents pressurized fluid from flowing from the controller 116 (FIG. 1), via the pressurized path 156 (FIG. 1), into the first propeller control flow input 104 (FIG. 1). The second land 332, however, still blocks the third port 356 to prevent pressurized fluid from flowing out of the first propeller control flow input 104 and into the pressure drain 248 (FIG. 1). As such, there is still pressurized fluid being applied to the first propeller control flow input 104. Moreover, the second control passage 320 still connects the second propeller control flow input 108 (FIG. 1) to the pressure drain 248, and the third land 336 still blocks the sixth port 368 to prevent pressurized fluid from flowing into the second propeller control flow input 108 from the controller 116 (FIG. 1). The valve 304 as shown in FIG. 2c is in a null condition. The first control passage 316, first and second lands 328 and 332, and first and third ports 348 and 356 operate together as a three-way control valve. The piston 308, as shown in FIG. 2c, is at about 33% of its upward stroke. As part of the backup flight mode, the piston 308 can be adjusted slightly up or down from that position as needed to pressurize or depressurize, respectively, the first propeller control flow input 104 and thus control the pitch of the propeller in the flight pitch range.

Thus, when the valve 304 is positioned as shown in FIG. 2c, the valve 304 becomes a redundant pitch control valve, i.e., if the device supplying pressurized fluid to the servo valve 304 (such as the controller 116 (FIG. 1)) fails, the valve 304 can be used to adjust the pitch of the propeller during flight. At the same time, the propeller control unit 100 (FIG. 1) is still locked out of the ground enable beta mode to prevent the second propeller control flow input 108 from becoming pressurized and adjusting the actuator to bring the propeller blade pitch below the minimum flight pitch.

In FIG. 2d, the valve 304 is positioned as necessary for the propeller control unit 100 to operate in the full feather overspeed protection mode. In that regard, the piston 308 has moved all the way down until the bottom of the cylinder 308 engages the lower stop 340. In this position, the first land 328 blocks the first port 348 such that pressurized fluid cannot flow from the controller 116 (FIG. 1) to the first propeller control flow input 104 (FIG. 1). Moreover, the first control passage 316 puts the second and third ports 352 and 356 in fluid communication such that pressurized fluid flows from the first propeller control flow input 104 to the pressure drain 248, and the second control passage 320 puts the fourth and fifth ports 360 and 364 in fluid communication such that the pressurized fluid flows from the second propeller control flow input 108 (FIG. 1) to the pressure drain 248 (FIG. 1). Lastly, the third land 336 still blocks the sixth port 368 to prevent pressurized fluid from flowing into the second propeller control flow input 108 from the controller 116 (FIG. 1).

Thus, when the valve 304 is positioned as shown in FIG. 2d, the valve 304 connects both the first and second propeller control flow inputs 104 (FIG. 1) and 108 (FIG. 1) to the pressure drain 248 and prevents any pressurized fluid from entering the first and second propeller control flow inputs 104 and 108 from the controller 116 (FIG. 1). As such, neither the first propeller control flow input 104, nor the second propeller control flow inputs 108, is pressurized and able to direct movement of the actuator to adjust propeller pitch. In this way, the servo valve 304 and controller 116 are locked out from affecting the pitch of the propeller. Thus, the full feathered overspeed protection mode is a default safety position in case an engine fails. When the propeller control unit 100 (FIG. 1) is in this mode, the propeller blades move to a feathered position where they do not windmill. Preventing the blades from wind-milling reduces drag and asymmetric control forces on multiple engine applications.

Figure 3:
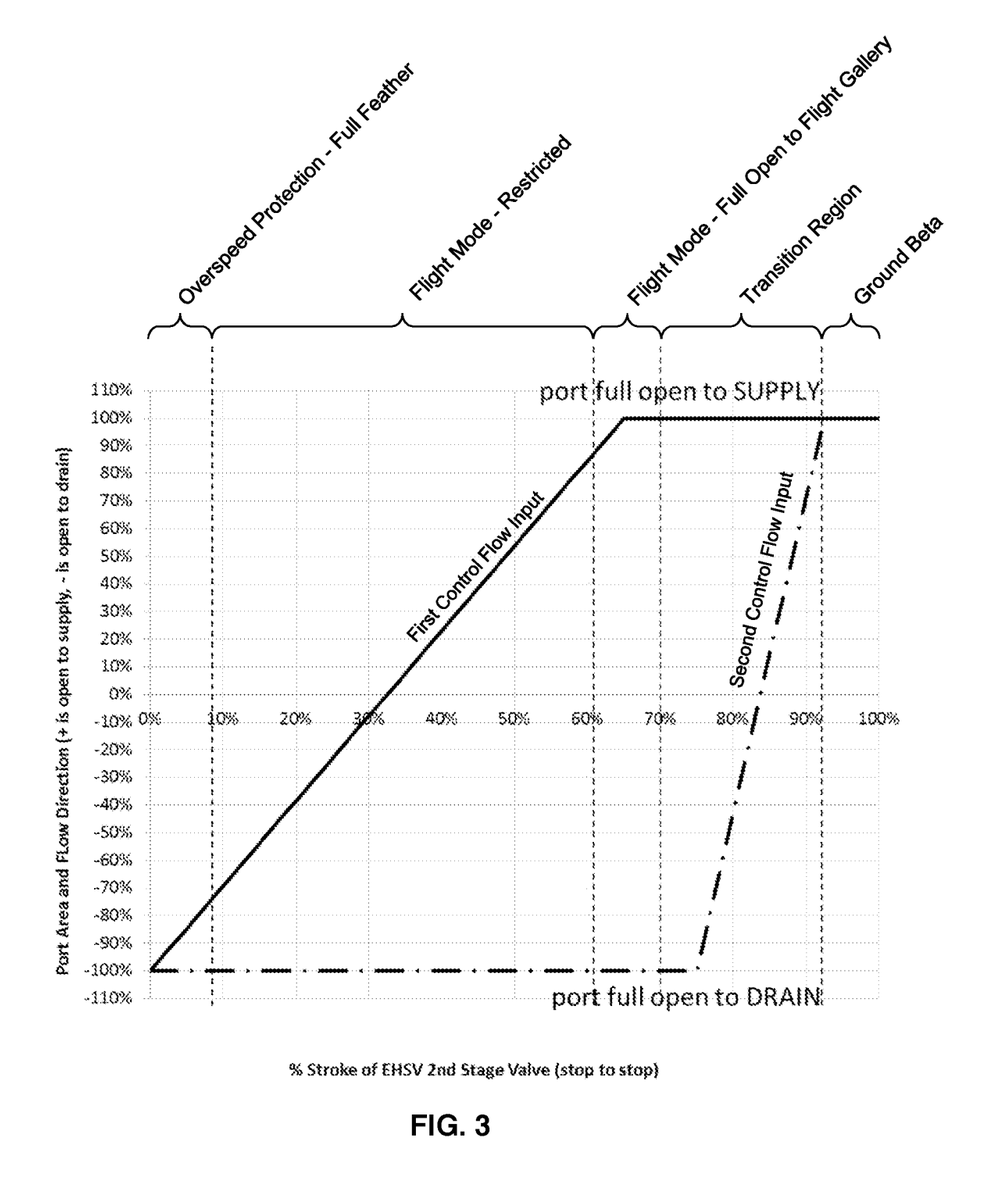
FIG. 3 illustrates a graph that represents how open a first propeller control flow input and a second propeller control flow input of a propeller actuator are to a pressurized fluid supply and a pressure drain based on the position of the valve shown in FIG. 2.

FIG. 3 provides a graphic representation of the four modes that relate to the positions of the piston 308 shown in FIGS. 2a-d. The x-axis represents the percentage of stroke of the piston 308, with 0% representing the piston 308 being in the lowest position of its stroke range (as shown in FIG. 2d) and 100% representing the piston 308 being in the highest position of its stroke range (as shown in FIG. 2a). The y-axis represents the percentage of the port area open between each of the first and second propeller control flow inputs and the fluid supply from the propeller pitch oil flow controller and the fluid drain. More specifically, −100% to 0% represents how open the port is between each of the inputs and the pressure drain, and 0% to 100% represents how open the port is between each of the inputs and the supply of pressurized fluid (i.e., pressurized fluid from the propeller pitch oil flow controller). As can be seen, from about 0% to 8% of the upward stroke of the piston 308, as shown along the x-axis, the second propeller control flow input is fully open to the drain, and the first propeller control flow input moves from 100% open to the drain to about 75% open to the drain. This 0% to 8% stroke range along the x-axis represents the movement of the piston 308 in the full feather overspeed protection mode, which is also illustrated in FIG. 2d.

With reference to the x-axis, from about 8% to 62% of the upward stroke of the piston 308, the second propeller control flow input is still 100% open to the drain, and the first propeller control flow input moves from about 75% open to the drain to about 89% open to the fluid supply. The first propeller control flow input transitions from being open to the drain to open to the fluid supply at around 33% of the upward stroke of the piston 308. This 8% to 62% stroke range along the x-axis represents the movement of the piston 308 in the back up (or restricted) flight mode, which can be seen in FIG. 2c.

As shown along the x-axis, from about 62% to 70% of the upward stroke of the piston 308, the second propeller control flow input is still 100% open to the drain, and the first propeller control flow input moves from about 89% open to the fluid supply to 100% open to the fluid supply. The first propeller control flow input becomes 100% open to the fluid supply at around 65% of the upward stroke of the piston 308. This 62% to 70% stroke range along the x-axis represents the movement of the piston 308 in the unrestricted normal maximum flight mode, which is also illustrated in FIG. 2b.

As shown along the x-axis, from about 70% to 92% of the upward stroke of the piston 308, the second propeller control flow input moves from 100% open to the drain to 100% open to the fluid supply. The second propeller control flow input transitions from being open to the drain to open to the fluid supply at around 84% of the upward stroke of the piston 308. The first propeller control flow input remains 100% open to the fluid supply from 70% to 92% of the upward stroke of the piston 308. This 70% to 92% stroke range along the x-axis represents the movement of the piston 308 in a transition range between the unrestricted normal maximum flight mode and ground beta enable mode.

As shown along the x-axis, from about 92% to 100% of the upward stroke of the piston 308, the second propeller control flow input and the first propeller control flow input are both 100% open to the fluid supply. This 92% to 100% stroke range along the x-axis represents the movement of the piston 308 in the ground beta enable mode, which is also illustrated in FIG. 2a.

All percentages in the graph of FIG. 3 are approximations and may vary depending on changes to the structure of the valve 304 and how the valve 304 is connected to the various fluid pathways, ports, and inputs in the propeller control unit 100. Additionally, the characteristics of the transitions may be linear as shown, but may also be curves that falls within the same approximate region.

The various embodiments and technologies disclosed herein provide a significant advantage over previous systems used in propeller control units. In particular, the various embodiments and technologies disclosed herein allow the use of a single EHSV valve to provide the functions of pitch control valve redundancy, overspeed protection, ground beta enablement and unrestricted flight enablement. By combining these functionalities into one EHSV, the size, weight, and cost of the propeller control unit can be reduced, which is beneficial for all kinds of propeller aircraft.

While endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. In addition, while particular elements, embodiments and applications of the present invention have been shown and described, it will be understood that the invention is not limited thereto since modifications can be made by those skilled in the art without departing from the scope of the present disclosure, particularly in light of the foregoing teachings.

The invention claimed is:

1. A propeller control system for controlling a blade pitch of a propeller, the propeller control system comprising:
    an actuator that includes a first flow input and a second flow input that can be used to control the blade pitch of the propeller in a flight pitch range and a ground pitch range;
    an electrohydraulic servo valve (EHSV) that includes a valve body defining an inner cavity in which is positioned a piston, wherein the EHSV further includes (i) a first port into the valve body that is in fluid communication with a fluid source, (ii) a second port into the valve body that is in fluid communication with the first flow input, (iii) a third port into the valve body that is in fluid communication with a drain, (iv) a fourth port into the valve body that is in fluid communication with the second flow input, and (v) a fifth port into the valve body that is in fluid communication with the fluid source, wherein the piston includes a first end portion, a first land, a second land, and a second end portion, wherein a first control passage is defined between the first end portion and the first land, a second control passage is defined between the first land and the second land, and a third control passage is defined between the second land and the second end portion; and
    an electronic control unit (ECU) configured to control the EHSV,
    wherein the piston is configured to be moved to:
    (i) a first position in which (a) the first port, first control passage, and second port are in fluid communication such that fluid flows from the fluid source to the first flow input, (b) the fourth port, third control passage, and fifth port are in fluid communication such that fluid flows from the fluid source to the second flow input, (c) the first land prevents the second port from being in fluid communication with the third port, and (d) the second land prevents the fourth port from being in fluid communication with the third port, wherein, when the piston is in the first position, the system is operated in a ground beta mode during which fluid flows from the fluid source to the first and second flow inputs;
    (ii) a second position in which (a) the first port, first control passage, and second port are in fluid communication such that fluid flows from the fluid source to the first flow input, (b) the first land prevents the second port from being in fluid communication with the third port, (c) the second land prevents the fourth port from being in fluid communication with the fifth port, and (d) the third port, second control passage, and fourth port are in fluid communication such that fluid flows from the second flow input to the drain, wherein, when the piston is in the second position, the system is in an unrestricted flight mode during which fluid flows from the fluid source to only the first flow input; and
    (iii) a third position at which (a) the first end portion prevents the first port from being in fluid communication with the second port, (b) the second land prevents the fourth and fifth ports from being in fluid communication with one another, (c) the third port, second control passage, and fourth port are in fluid communication such that fluid flows from the second flow input to the drain, and (d) the second port, first control passage, and third port are in fluid communication such that fluid flows from the first flow input to the drain, wherein, when the piston is in the third position, the system is in a full feather mode during which the EHSV prevents fluid from flowing to the first flow input and the second flow input.

2. The propeller control system of claim 1, wherein the ECU is configured to control the EHSV such that the piston can be moved to a range of positions between the second and third positions, at which (a) the first end portion prevents the first port from being in fluid communication with the second port, (b) the third port, second control passage, and fourth port are in fluid communication such that fluid flows from the second flow input to the drain, (c) the first land prevents the second port from being in fluid communication with the third port, and (d) the second land prevents the fourth and fifth ports from being in fluid communication with one another, wherein, when the piston is in the range of positions between the second and third positions, the system is in a restricted flight mode during which the EHSV controls the fluid flow of fluid to the first flow input.

3. The propeller control system of claim 1, wherein when the piston is in the first position, the pitch of the propeller can be adjusted in a range extending from below a flight minimum pitch angle to a full reverse pitch angle.

4. The propeller control system of claim 1, wherein when the piston is in the second position, the pitch of the propeller can be adjusted in a range between fine and coarse pitch angles that are greater than a flight minimum pitch angle.

5. The propeller control system of claim 1, wherein when the piston is in the third position, the propeller moves to a feathered position.

6. A propeller control system for controlling a blade pitch of a propeller, the propeller control system comprising:
    an actuator that includes a first flow input and a second flow input that can be used to control the blade pitch of the propeller in a flight pitch range and a ground pitch range;
    an electrohydraulic servo valve (EHSV) that includes a valve body defining an inner cavity in which is positioned a piston, wherein the EHSV further includes (i) a first port into the valve body that is in fluid communication with a fluid source, (ii) a second port into the valve body that is in fluid communication with the first flow input, (iii) a third port into the valve body that is in fluid communication with a drain,
    (iv) a fourth port into the valve body that is in fluid communication with the second flow input, and (v) a fifth port into the valve body that is in fluid communication with the fluid source, wherein the piston includes a first end portion, a first land, a second land, and a second end portion, wherein a first control passage is defined between the first end portion and the first land, a second control passage is defined between the first land and the second land, and a third control passage is defined between the second land and the second end portion; and
    an electronic control unit (ECU) configured to control the EHSV,
    wherein the piston is configured to be moved to:
    (i) a first position at which (a) the first port, first control passage, and second port are in fluid communication such that fluid flows from the fluid source to the first flow input, (b) the fourth port, third control passage, and fifth port are in fluid communication such that fluid flows from the fluid source to the second flow input, (c) the first land prevents the second port from being in fluid communication with the third port, and (d) the second land prevents the fourth port from being in fluid communication with the third port, wherein, when the piston is in the first position, the system is in a ground beta mode during which fluid flows from the fluid source to the first and second flow inputs;

(ii) a second position at which (a) the first port, first control passage, and second port are in fluid communication such that fluid flows from the fluid source to the first flow input, (b) the first land prevents the second port from being in fluid communication with the third port, (c) the second land prevents the fourth port from being in fluid communication with the fifth port, and (d) the third port, second control passage, and fourth port are in fluid communication such that fluid flows from the second flow input to the drain, wherein, when the piston is in the second position, the system is in an unrestricted flight mode during which fluid flows from the fluid source to only the first flow input;

(iii) a third position at which (a) the first end portion prevents the first port from being in fluid communication with the second port, (b) the third port, second control passage, and fourth port are in fluid communication such that fluid flows from the second flow input to the drain, (c) the first land prevents the second port from being in fluid communication with the third port, and (d) the second land prevents the fourth and fifth ports from being in fluid communication with one another, wherein, when the piston is in the third position, the system is in a restricted flight mode during which the EHSV controls fluid flow to the first flow input; and (iv) a fourth position at which (a) the first end portion prevents the first port from being in fluid communication with the second port, (b) the second land prevents the fourth and fifth ports from being in fluid communication with one another, (c) the third port, second control passage, and fourth port are in fluid communication such that fluid flows from the second flow input to the drain, and (d) the second port, first control passage, and third port are in fluid communication such that fluid flows from the first flow input to the drain, wherein, when the piston is in the fourth position, the system is in a full feather mode during which the EHSV prevents fluid from flowing to the first flow input and the second flow input.

7. The propeller control system of claim 6, wherein when the piston is in the first position, the pitch of the propeller can be adjusted in a range extending from below a flight minimum pitch angle to a full reverse pitch angle.

8. The propeller control system of claim 6, wherein when the piston is in the second position, the pitch of the propeller can be adjusted in a range between fine and coarse pitch angles that are greater than a flight minimum pitch angle.

9. The propeller control system of claim 6, wherein when the piston is in the fourth position, propeller moves to a feathered position.

10. A propeller control system for controlling a blade pitch of a propeller, the propeller control system comprising:
an actuator that includes a first flow input and a second flow input that can be used to control the blade pitch of the propeller in a flight pitch range and a ground pitch range;

an electrohydraulic servo valve (EHSV) that includes a valve body defining an inner cavity in which is positioned a piston, wherein the EHSV further includes (i) a first port into the valve body that is in fluid communication with a fluid source, (ii) a second port into the valve body that is in fluid communication with the first flow input, (iii) a third port into the valve body that is in fluid communication with a drain, (iv) a fourth port into the valve body that is in fluid communication with the drain, (v) a fifth port into the valve body that is in fluid communication with the second flow input, (vi) a sixth port into the valve body that is in fluid communication with the second flow input, and (vii) a seventh port into the valve body that is in fluid communication with the fluid source, wherein the piston includes a first end portion, a first land, a second land, and a second end portion, wherein a first control passage is defined between the first end portion and the first land, a second control passage is defined between the first land and the second land, and a third control passage is defined between the second land and the second end portion; and an electronic control unit (ECU) configured to control the EHSV, wherein the piston is configured to be moved to:

(i) a first position at which (a) the first port, first control passage, and second port are in fluid communication such that fluid flows from the fluid source to the first flow input, (b) the seventh port, third control passage, and sixth port are in fluid communication such that fluid flows from the fluid source to the second flow input, (c) the first land prevents the second port from being in fluid communication with the third port, and (d) the second land prevents the fifth and sixth ports from being in fluid communication with the fourth port, wherein, when the piston is in the first position, the system is in a ground beta mode during which fluid flows from the fluid source to the first and second flow inputs;

(ii) a second position at which (a) the first port, first control passage, and second port are in fluid communication such that fluid flows from the fluid source to the first flow input, (b) the first land prevents the second port from being in fluid communication with the third port, (c) the second land prevents the seventh port from being in fluid communication with the sixth port, and (d) the fourth port, second control passage, and fifth port are in fluid communication such that fluid flows from the second flow input to the drain, wherein, when the piston is in the second position, the system is in an unrestricted flight mode during which fluid flows from the fluid source to only the first flow input;

(iii) a third position at which (a) the first end portion prevents the first port from being in fluid communication with the second port, (b) the fourth port, second control passage, and fifth port are in fluid communication such that fluid flows form the second flow input to the drain, (c), the first land prevents the second port from being in fluid communication with the third port, and (d) the second land prevents the sixth and seventh ports from being in fluid communication with one another, wherein, when the piston is in the third position, the system is in a restricted flight mode during which the EHSV controls fluid flow to the first flow input; and (iv) a fourth position at which (a) the first end portion prevents the first port from being in fluid communication with the second port, (b) the second land prevents the sixth and seventh ports from being in fluid communication with one another, (c) the fourth port, second control passage, and fifth port are in fluid communication such that fluid flows from the second flow input to the drain, and (d) the second port, first control passage, and third port are in fluid communication such that fluid flows from the first flow input to the drain, wherein, when the piston is in the fourth position, the system is in a full feather mode during which the EHSV prevents fluid from flowing to the first flow input and the second flow input.

11. The propeller control system of claim 10, wherein when the piston is in the first position, the pitch of the propeller can be adjusted in a range extending from below a flight minimum pitch angle to a full reverse pitch angle.

12. The propeller control system of claim 10, wherein when the piston is in the second position, the pitch of the propeller can be adjusted in a range between fine and coarse pitch angles that are greater than a flight minimum pitch angle.

13. The propeller control system of claim 10, wherein when the piston is in the fourth position, the propeller moves to a feathered position.

* * * * *